(12) United States Patent
Liu

(10) Patent No.: US 6,847,805 B2
(45) Date of Patent: Jan. 25, 2005

(54) METHOD FOR CLOSED-LOOP SUBSPACE TRANSMISSION AND RECEPTION IN A TWO TRANSMIT N-RECEIVE ANTENNA SYSTEM

(75) Inventor: Jung-Tao Liu, Randolph, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 439 days.

(21) Appl. No.: 10/112,232

(22) Filed: Mar. 29, 2002

(65) Prior Publication Data

US 2004/0203473 A1 Oct. 14, 2004

(51) Int. Cl.⁷ .............................. H04B 1/00; H04B 7/00; H04B 17/00
(52) U.S. Cl. ..................... 455/69; 455/68; 455/67.11
(58) Field of Search ..................... 455/466, 39, 63.1, 455/63.4, 65, 68, 67.11, 67.13, 67.16, 69; 370/252, 310; 375/221, 245

(56) References Cited

U.S. PATENT DOCUMENTS

| | | | | | |
|---|---|---|---|---|---|
| 2003/0185309 | A1 | * | 10/2003 | Pautler et al. | 375/257 |
| 2004/0042427 | A1 | * | 3/2004 | Hottinen | 370/335 |
| 2004/0087308 | A1 | * | 5/2004 | Tikkonen et al. | 455/445 |

FOREIGN PATENT DOCUMENTS

EP     1 289 169 A     3/2003

OTHER PUBLICATIONS

Hamalainen et al, "Closed loop transmit diversity for FDD WCDMA systems", Asilomar conference on signals, systems and computers, 2000, vol. 1, pp. 111 to 115.*

Joengren G et al: "Utilizing Quantized Feedback Information in Orthogonal Space–Time Block Coding" Globecome'00. 2000 IEEE Global Telecommunications Conference. San Francisco, CA, Nov. 27—Dec. 1, 2000, IEEE Global Telecommunications Conference, New York, NY: IEEE, US, vol. 2 of 4, Nov. 27, 2000, pp. 995–999, XP001017234 ISBN: 0–7803–6452–X *abstract* *p. 996, col. 2, paragraph 5——p. 997, col. 1, paragraph 1*.

Aradhana Narula et al: "Efficient use of side information in multiple–antenna data transmission over fading channels" IEEE Journal on Selected Areas in Communications, IEEE Inc. New York, US, vol. 16, no. 8, Oct. 1998, XP002901983 ISSN: 0733–8716 *abstract*.

* cited by examiner

*Primary Examiner*—Vivian Chin
*Assistant Examiner*—Raymond B. Persino

(57) ABSTRACT

A method for generating channel quality feedback information in terms of quantized eigenvectors calculated from an eigenvalue decomposition that uses a channel matrix and an eigenvalue matrix to generate quantized and bounded eigenvectors. The channel correlation matrix and the eigenvalue matrix are obtained from a channel matrix formed from channel measurements of various signal parameters of signals transmitted over the communication channel. The eigenvalue decomposition uses the elements of the channel correlation matrix, the elements of the eigenvalue matrix and conditional relationships between elements of the channel correlation matrix to calculate the quantized and bounded eigenvectors. Because the elements of the quantized bounded eigenvectors can be expressed in terms of each other, not all elements of the quantized bounded vectors need be transmitted over the communication channel resulting in efficient use of the communication channel.

8 Claims, 1 Drawing Sheet

METHOD FOR CLOSED-LOOP SUBSPACE TRANSMISSION AND RECEPTION IN A TWO TRANSMIT N-RECEIVE ANTENNA SYSTEM

BACKGROUND OF THE INVENTION

1. Field of the Invention

The present invention relates generally to antennas in communication systems and more particularly to antenna systems in wireless communication systems.

2. Description of the Related Art

Antennas are part of some of the more critical components of a communication system, and in particular, wireless communication systems. In wireless communication systems, communication signals that are transmitted by antennas over traffic channels and signaling channels will at some point propagate through the air and be received by other antennas. Thus, part of or all of the medium of the traffic and signaling channels is the air itself. The traffic channels are communication channels through which users of the wireless communication system convey (i.e., transmit and/or receive) communication signals to each other. The communication signals typically carry information being conveyed between users. The signaling channels are communication channels through which signals that facilitate the control, maintenance and management of the communication system are conveyed. The signaling signals are typically transmitted by system equipment and user equipment. System equipment are various communication equipment owned, controlled and operated by a system operator or provider. Examples of system operators include local telephone companies and Internet service providers. User equipment are equipment that are typically owned and operated by users of the communication system. Examples of user equipment include cellular phones, wireless personal computers and pagers.

As the communication signals propagate through the air, they are adversely affected by various anomalies that distort such signals and cause part or all of the information being carried by said signals to be received erroneously. The quality of the communication channels can greatly affect the communication system's throughput. The throughput is the amount of information that is received without any errors for a given period of time. The various anomalies of a communication channel can adversely affect any one or all of a signal's parameters; some of these parameters include signal amplitude, signal phase, signal frequency. The signals are transmitted by transmit antennas and received by receive antennas. It should be noted that the antennas are often designed to operate as both transmit and receive antennas. To reduce the anomalous effects of a communication channel, communication systems often employ a feedback technique where a receive antenna transmits channel quality feedback information to a transmit antenna allowing the transmit antenna to modify, in some fashion, one or more of the signal's parameters. The channel quality feedback information is information about how transmitted signals are affected by the communication channel through which they have propagated. The signals propagating through the communication channel can therefore be manipulated so as to be less vulnerable to the various channel anomalies; thus the adverse effects of the channel are effectively reduced thus increasing throughput. Also, to increase system throughput, the communication system can use more than one transmit antenna and more than one receive antenna for the same or different signals.

Suppose, there are two transmit antennas and two receive antennas. The same information is transmitted by both transmit antennas. Although, the signals carry the same information, they may have different parameters. Therefore, the signals may be affected differently by the communication channel. Even when the signals carry the same information and have the same parameters, they may still be affected differently by the communication channel. One feedback technique used by many communication systems is to have the receive antennas transmit channel quality feedback information to the transmit antenna informing the transmit antennas about the quality of the transmitted signals. The parameters of the transmitted signal least adversely affected by the communication channel is then used in ensuing transmissions by the transmit antennas in an effort to improve the quality of the received signals.

Another technique is to pre-distort the transmit signals based on the channel quality feedback information received by the transmit antennas from the receive antennas. The pre-distortion compensates for the anomalies that the transmitted signals experience as they propagate through the communication channel. The channel quality feedback information may be based on measurements of previously transmitted signals or measurements of various channel parameters from signals transmitted over the signaling channel. A signal that is typically transmitted over the signaling channel and measured by the system is the pilot signal. Many wireless communication systems have a pilot signal that, among other purposes, serves to signal the presence of system equipment.

Yet, another technique is to measure the amount of energy contained in the two receive signals and send that information back to the transmit antennas. The parameters of the signal having the higher measured energy will be used for the next transmission. In all of the above feedback techniques, a rather brute force method is used to determine which set of signal parameters will allow a transmitted signal to be relatively less adversely affected by the communication channel. These brute force methods require a relatively large amount of information to be fed back to the transmit antennas. Further, the channel quality feedback information is continuously being sent back to the transmit antennas. Many communication systems have limited bandwidth for their signaling channels through which other critical information are conveyed. It may not, therefore, be practical to send all of the feedback information. Also, because the communication channel is a continually varying dynamic system, it may not be possible to efficiently and quickly modify the transmit signal to reduce its vulnerability to the channel anomalies.

Some communication systems attempt to characterize the communication channel mathematically so as to be able to develop more comprehensive channel quality feedback information that can sufficiently track the variations in the communication channel. For example, the communication channel can be modeled as an Eigenspace represented by an eigenvector matrix whose elements are complex numbers each of which is a basic unit that represents one or more measured parameters of the communication channel. The measured parameters of the channel include, for example, the effect of the channel on a signal's amplitude, the effect of the channel on a signal's phase and the effect of the channel on a signal's frequency. The measured channel parameters are also called channel parameters. For example suppose a signal is transmitted with an amplitude of 0 db, but such signal is received with a measured amplitude of −3 dB. The channel parameter for amplitude is thus −3 dB. When more than one transmitter and receiver are used, a channel parameter matrix can be generated from measured channel parameters.

A channel matrix can thus be formed from measurements of channel parameters. Again suppose, there are two transmit antennas ($T_1$ and $T_2$) and two receive antennas ($R_1$ and $R_2$). The channel parameter measurement at receive antenna $R_1$ due to a signal transmitted by transmit antenna $T_1$ is designated $h_{11}$. The channel parameter measurement at receive antenna $R_2$ due to a signal transmitted by transmit antenna $T_1$ is designated $h_{12}$. The channel parameter measurement at receive antenna $R_1$ due to a signal transmitted by transmit antenna $T_2$ is designated $h_{21}$. The channel parameter measurement at receive antenna $R_2$ due to a signal transmitted by transmit antenna $T_2$ is designated $h_{22}$. The measured channel parameters are elements of the channel matrix H, where:

$$H = \begin{bmatrix} h_{11} & h_{12} \\ h_{21} & h_{22} \end{bmatrix}$$

and where $h_{11}, h_{12}, h_{21}$ and $h_{22}$ are complex numbers having complex conjugates $h_{11}^*, h_{12}^*, h_{21}^*$ and $h_{22}^*$. A channel correlation matrix is obtained by performing a Hermitian operation on the channel matrix and premultiplying the channel matrix with this Hermitian matrix. The Hermitian operation is a well known matrix mathematical conversion in which all of the elements of the matrix are changed to their complex conjugates and the transpose of the complex conjugate matrix is performed. Thus the Hermitian matrix of channel matrix H is $H^+$ where $H^+ = [H^*]^T$. The channel correlation matrix is designated as S where $S = H^+H$.

The elements of the channel correlation matrix, S, are related to eigenvalues and eigenvectors which can be obtained by a well known procedure called an eigenvalue decomposition, *Applied Linear Algebra*, 2d edition, Ben Noble, James W. Daniel, Prentice Hall Inc., 1977 and 1969, ISBN 0-13-041343-7. First it is recognized that $S = \Sigma \Lambda \Sigma^+$ where $\Sigma$ is the eigenvector matrix. $\Sigma$ is a unitary matrix meaning that $\Sigma^+\Sigma = \Sigma\Sigma^+ = I$ where I is an identity matrix. $\Lambda$ is a diagonal eigenvalue matrix whose elements are eigenvalues and $\Sigma$ is a matrix whose columns are eigenvectors. For a 2×2 system (i.e., two transmit antennas and two receive antennas):

$$\Lambda = \begin{bmatrix} \lambda_1 & 0 \\ 0 & \lambda_2 \end{bmatrix}$$

where elements $\lambda_1$ and $\lambda_2$ are the eigenvalues; and $\Sigma = [e_1 \; e_2]$ where $e_1$ and $e_2$ are eigenvectors which are the columns of the eigenvector matrix. Also, for a 2×2 system, $$I = \begin{bmatrix} 1 & 0 \\ 0 & 1 \end{bmatrix}.$$

Because S is known and I is a known constant matrix, the eigenvalues (i.e., $\lambda$) are obtained by solving the following equation:

$$det[S-\lambda I]=0$$

where det represents the determinant operation. The values for $\Sigma$ are then obtained by solving the equation $Se = \lambda e$; i.e., because S is known and $\lambda$ is known, e can be determined. Once the eigenvectors are obtained, channel quality feedback information—represented in terms of the eigenvectors—is sent or fed back to the transmit antennas to allow these antennas to modify the transmit signals so as to reduce the distortion experienced by these signals.

The channel quality feedback information in the form of eigenvalues and/or eigenvectors represents a relatively large amount of information that is to be periodically transmitted over band-limited signaling channels of the communication system. Further, many times some of the channel information being transmitted in the form of eigenvalues and/or eigenvectors are not as accurate in their characterization of the communication channel. In other words, there are certain eigenvalues that more accurately represent the communication channel characteristics than other eigenvalues. Therefore, not only is a great amount of information sent over the already band-limited signaling channel, but many times much of this information is not useful for reducing the anomalous effects of the communication channel.

SUMMARY OF THE INVENTION

The present invention provides a method for generating channel quality feedback information by quantizing eigenvectors that characterize a communication channel. The eigenvectors are calculated from an eigenvalue decomposition of a channel correlation matrix. The channel correlation matrix is created from a channel matrix formed from measurements of at least one signal parameter of a signal transmitted over the communication channel. The elements of the channel correlation matrix are obtained through a Hermitian operation with the channel matrix. Conditional relations between elements of the channel correlation matrix are noted and thus established.

In the eigenvalue decomposition of the channel correlation matrix, the channel correlation matrix is expressed in terms of an eigenvector matrix and an eigenvalue matrix. The elements of the eigenvector matrix are calculated and certain solutions for the elements of the eigenvector matrix are selected. The selected solution result in two relationships between elements of the eigenvector matrix and eigenvalue matrix. The first relationship is that elements of the eigenvector matrix can be expressed of terms of other elements of the eigenvector matrix. The second relationship is that the elements of the eigenvector matrix can be expressed in terms of the eigenvalues and elements of the channel correlation matrix. Also, the eigenvalues are calculated and certain solution are selected based on some conditional relationship between elements of the channel correlation matrix. Because of these relationships in the channel correlation matrix as well as the selected eigenvalues, the elements of the eigenvector matrix are bounded. The boundaries for the elements of the eigenvector matrix are calculated from the two relationships.

Once the boundaries of the eigenvectors are known the eigenvectors are then quantized meaning that certain values for the elements of the eigenvectors located within the boundaries are selected in accordance with an algorithm. The resulting eigenvectors having quantized and bounded elements, i.e., the bounded quantized eigenvectors are transmitted as channel quality feedback information. The quantized bounded eigenvectors contain relatively accurate channel quality feedback information and can be sent using a relatively small amount of information because the elements of these eigenvectors are mathematically related to each other; that is, not all of the bounded quantized eigenvectors need be transmitted over the communication channel thus allowing efficient use of the communication channel. The elements of the quantized bounded eigenvectors that are transmitted can be used to determine the eigenvectors that are not transmitted because of the mathematical relationship between the elements the elements of different quantized bounded eigenvectors.

DETAILED DESCRIPTION

Figure 1:
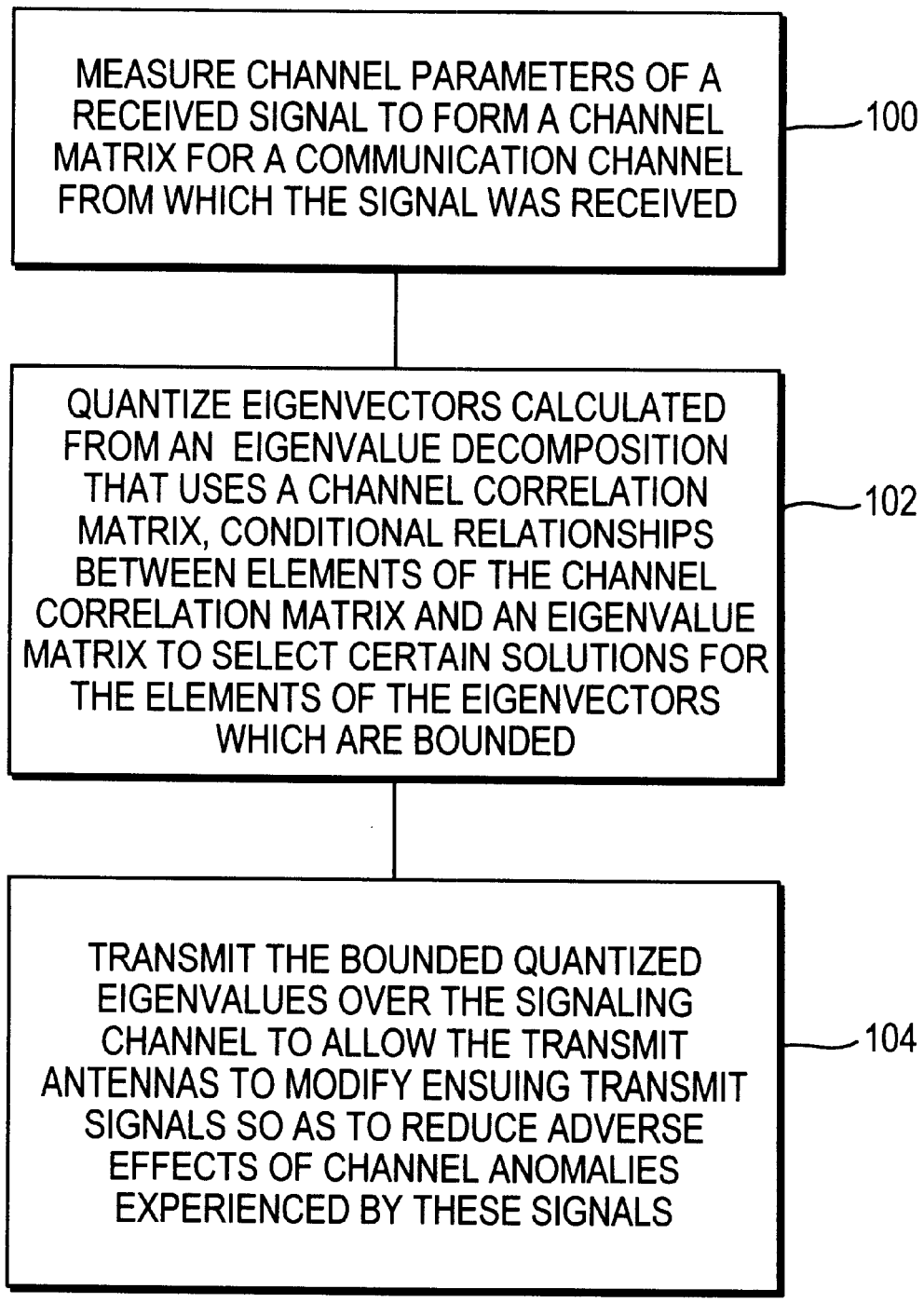
FIG. 1 is a flow chart of the method of the present invention.

The present invention provides a method for generating channel quality feedback information by quantizing eigenvectors that characterize a communication channel. The eigenvectors are calculated from an eigenvalue decomposition of a channel correlation matrix. The channel correlation matrix is created from a channel matrix formed from measurements of at least one signal parameter of a signal transmitted over the communication channel. The elements of the channel correlation matrix are obtained through a Hermitian operation with the channel matrix. Conditional relations between elements of the channel correlation matrix are noted and thus established.

In the eigenvalue decomposition of the channel correlation matrix, the channel correlation matrix is expressed in terms of an eigenvector matrix and an eigenvalue matrix. The elements of the eigenvector matrix are calculated and certain solutions for the elements of the eigenvector matrix are selected. The selected solution result in two relationships between elements of the eigenvector matrix and eigenvalue matrix. The first relationship is that elements of the eigenvector matrix can be expressed of terms of other elements of the eigenvector matrix. The second relationship is that the elements of the eigenvector matrix can be expressed in terms of the eigenvalues and elements of the channel correlation matrix. Also, the eigenvalues are calculated and certain solution are selected based on some conditional relationship between elements of the channel correlation matrix. Because of these relationships in the channel correlation matrix as well as the selected eigenvalues, the elements of the eigenvector matrix are bounded. The boundaries for the elements of the eigenvector matrix are calculated from the two relationships.

Once the boundaries of the eigenvectors are known the eigenvectors are then quantized meaning that certain values for the elements of the eigenvectors located within the boundaries are selected in accordance with an algorithm. The resulting eigenvectors having quantized and bounded elements, i.e., the bounded quantized eigenvectors are transmitted as channel quality feedback information. The quantized bounded eigenvectors contain relatively accurate channel quality feedback information and can be sent using a relatively small amount of information because the elements of these eigenvectors are mathematically related to each other; that is, not all of the bounded quantized eigenvectors need be transmitted over the communication channel thus allowing efficient use of the communication channel. The elements of the quantized bounded eigenvectors that are transmitted can be used to determine the eigenvectors that are not transmitted because of the mathematical relationship between the elements the elements of different quantized bounded eigenvectors.

Referring now to FIG. 1, there is shown the method of the present invention. For ease of discussion, the method of the present invention will be explained in the context of a 2×2 system; that is, a system which contains two transmit antennas and two receive antennas. It will be appreciated by those skilled in the art to which this invention belongs that this invention includes systems with any number of receive antennas. Thus, in general, the method of the present invention is applicable to any 2×N system with 2 transmit antennas and N receive antennas where N is any integer equal to 2 or greater.

In step 100, receive antennas and associated hardware and software measure at least one parameter of received signals to create a channel matrix, H. The at least one signal parameter that is being measured can be, for example, the signal's voltage and the signal's relative phase both of which can be represented by one complex eigenvalue. The different measurements become elements of a channel matrix. The channel matrix thus contains measurements of parameters of received signals that propagated through the channel. The channel correlation matrix, S, is then calculated from the channel matrix by the following operation: $H^+H$. The channel correlation matrix, S, is defined as follows:

$$S = H^+H = \begin{bmatrix} a & b \\ b^* & d \end{bmatrix} = \Sigma \Lambda \Sigma^+$$

where the elements of the channel correlation matrix (a, b, and d) are complex numbers and the elements of the unitary eigenvector matrix, $\Sigma$, are eigenvectors representing the voltage and phase channel characteristic of a received signal. It will readily obvious that the elements of the eigenvector matrix can represent signal characteristics other than voltage and phase. The eigenvector matrix is represented as follows:

$$\Sigma = \begin{bmatrix} V_{11} & V_{12} \\ V_{21} & V_{22} \end{bmatrix} = \begin{bmatrix} e_1 & e_2 \end{bmatrix} \text{ where } e_1 = \begin{bmatrix} V_{11} \\ V_{21} \end{bmatrix} \text{ and } e_2 = \begin{bmatrix} V_{12} \\ V_{22} \end{bmatrix};$$

$e_1$ and $e_2$ are eigenvectors. The values for the elements of the channel correlation matrix are known at this point. Therefore the relationships between elements of the channel correlation matrix are apparent once the channel correlation matrix is calculated using the channel matrix and its Hermitian operator as discussed above. By noting and thus establishing one or more conditional relationships between elements of the channel correlation matrix, S, and solving for the elements of the eigenvector matrix through the well known eigenvalue decomposition process, the elements within the eigenvectors (i.e., $V_{11}, V_{12}, V_{21}$ and $V_{22}$) are obtained in terms of the elements of the channel correlation matrix. It is well understood that the eigenvector matrix $\Sigma$ that is obtained by performing eigenvalue decomposition on a channel correlation matrix has many solutions. In this invention, a particular solution is selected because of its simplifying effects. The solution in which the eigenvector matrix $\Sigma$ has a particular first relationship between its elements is selected. This first relationship is as follows: $V_{11}=V_{22}$, $V_{12}=-V_{21}^*$ and $V_{11}^2+V_2^2+V_3^2=1$. Part of this first relationship between elements of the eigenvector matrix is thus expressed by the following equation, $$\Sigma = \begin{bmatrix} V_{11} & V_{12} \\ V_{21} & V_{22} \end{bmatrix} = \begin{bmatrix} V_{11} & V_2+jV_3 \\ -V_2+jV_3 & V_{11} \end{bmatrix},$$

where $V_2$ is the real part of the complex number $V_{12}$, $V_3$ is the imaginary part of the complex number $V_{12}$, i.e., $V_{12}=V_2+jV_3$. Also, it should be noted that, $V_{11}$, $V_2$, $V_3$ are real numbers while $V_{12}$, $V_{21}$ are complex numbers. When an eigenvector matrix $\Sigma$ whose elements have this first relationship described above is selected, an additional or second relationship results. The second relationship is that the elements of the eigenvectors can be expressed in terms of the elements of the channel correlation matrix and the eigenvalues. In particular, the second relationship is as follows:

$$V_{11} = \frac{|b|}{\sqrt{|b|^2 + (\lambda_1 - a)^2}}, \text{ and}$$

$$V_{12} = \frac{(\lambda_2 - d)}{\sqrt{|b|^2 + (\lambda_2 - d)^2}} \frac{b}{|b|}$$

where $\lambda_1$ is an eigenvalue related to the first eigenvector $e_1$ and $\lambda_2$ is an eigenvalue related to the second eigenvector $e_2$. Because this second relationship allows the elements ($V_{11}$, $V_{12}$) of the eigenvector matrix ($\Sigma$) to be expressed in terms of the eigenvalues ($\lambda_1, \lambda_2$) and the elements (a, b, d) of the channel correlation matrix, S, the boundary conditions of the of the elements of the eigenvectors can be calculated. In other words, by calculating the eigenvalues in terms of the elements of the channel correlation matrix and using the conditional relationships (e.g., a<d; a>d) of the channel correlation matrix, the boundaries of the elements of the eigenvector matrix can be calculated. In particular, an expression for $\lambda_1$ is obtained based on various conditional relationships between elements of the channel correlation matrix (e.g., conditional relationships between a and b). When the conditional relationship a<d is met, the eigenvalue $\lambda_1$ is calculated using the following equation:

$$\lambda_1 = \frac{1}{2}\left[a + d - \sqrt{(a-d)^2 + 4|b|^2}\right].$$

When the conditional relationship a>d is met, the eigenvalue $\lambda_1$ is calculated using the following equation:

$$\lambda_1 = \frac{1}{2}\left[a + d + \sqrt{(a-d)^2 + 4|b|^2}\right]$$

By calculating the eigenvalue $\lambda_1$ according the conditional relationship between a and d, the boundaries of the elements $V_{11}$, $V_2$, $V_3$ of the eigenvalue matrix can then be calculated and are as follows:

$$\frac{1}{\sqrt{2}} \leq V_{11} \leq 1,$$

$$0 \leq |V_2| \leq \frac{1}{\sqrt{2}},$$

$$\text{and } 0 \leq |V_3| \leq \frac{1}{\sqrt{2}}.$$

It should be noted that the above boundary values could have also been calculated using eigenvalue $\lambda_2$ and the established conditional relationship between elements of the channel correlation matrix.

In step 102 of the method of the present invention, the elements of the calculated eigenvectors are quantized separately independent of other elements. Because the values of the elements of the eigenvectors are bounded, any value falling within the boundary can be selected for that element. One particular algorithm used is to select values that are equidistant from each other along the range of values; this is called the equidistant algorithm. Another algorithm that can be used is to select values, which are the center points of adjacent intervals within the boundary, such that the probability a given value falls within a given range is the same. This is called the equi-probability algorithm. Another algorithm that can be used is to perform statistical analysis to determine the values, which when transmitted as channel quality feedback information, would least likely be received in error; this is called the statistical algorithm. Because of the relationship between the elements within the eigenvectors, only two real numbers need be transmitted. In the example above, only real numbers $V_{11}$ and $V_2$ need be transmitted since the remaining elements can be determined from these two numbers. Therefore, a relatively lesser amount of channel quality feedback information is transmitted to the transmit antennas; this is especially advantageous for band-limited signaling channels which typically are the communication channels through which these quantized eigenvalues are transmitted. Thus, in the example above only certain elements of the quantized bounded eigenvectors need be transmitted; the other elements can be calculated from the transmitted elements. The signaling channels can be part of a wireless communication system or a wireline communication system.

In step 104, the quantized bounded eigenvectors representing channel quality feedback information are transmitted over a communication channel to the transmit antennas. The communication channel over which such channel quality feedback information is transmitted is preferably a signaling channel. However, the channel quality feedback information can be transmitted over a traffic channel. The transmit antennas receiving the channel quality feedback information use such information to modify ensuing transmit signals so as to reduce adverse effects of the channel anomalies experienced by these signals. The quantized bounded eigenvectors can be transmitted by system equipment and/or user equipment of the communication system.

It should be noted that the method of the present invention can reside as a set of instructions (i.e., a computer program, a software package), firmware, digital circuitry, analog circuitry or any combination thereof in system equipment and/or user equipment (e.g., cellular phone, pager, wireless personal computer) of the communication system. The communication system can be a wireline or wireless communication system.

I claim:

1. A method of generating channel quality feedback information for a communication channel of a communication system, the method comprising the step of:
   quantizing eigenvectors having elements and representing channel quality feedback information that is to be transmitted over the communication channel where
   the eigenvectors are calculated from an eigenvalue decomposition that uses a channel correlation matrix, conditional relationships between elements of the channel correlation matrix and an eigenvalue matrix to select certain solutions for the eigenvectors whereby
   the selected solutions are bounded eigenvectors whose elements can be expressed in terms of other eigenvector elements, elements of the channel correlation matrix and elements of the eigenvalue matrix and
   where the channel correlation matrix and the eigenvalue matrix are obtained from a channel matrix formed from measurements of channel parameters.

2. The method of claim 1 where the step of quantizing eigenvectors comprises the steps of:
   calculating boundaries of the elements of the selected eigenvectors from the elements of the eigenvector matrix, the elements of the eigenvalue matrix and the elements of the channel correlation matrix; and selecting a value that is within the calculated boundaries in accordance with an algorithm.

3. The method of claim 2 where the algorithm is an equidistant algorithm.

4. The method of claim 2 where the algorithm is equi-probability algorithm.

5. The method of claim 2 where the algorithm is a statistical algorithm.

6. The method of claim 1 further comprising the step of transmitting the quantized bounded eigenvectors over the communication channel allowing these eigenvectors to be used to reduce channel anomalies experienced by signals transmitted over the communication channel.

7. The method of claim 1 where the communication channel is part of a wireless communication system and where the bounded eigenvectors are calculated and quantized by system equipment of the wireless communication system.

8. The method of claim 1 where the communication channel is part of a wireless communication system and where the bounded eigenvectors are calculated and quantized by user equipment of the wireless communication system.

* * * * *